United States Patent [19]

Nose et al.

[11] Patent Number: 5,079,491
[45] Date of Patent: Jan. 7, 1992

[54] ROBOT CONTROL SYSTEM

[75] Inventors: Hidetaka Nose; Kazuhiro Kawabata; Yoshihiko Suzuki; Toshiaki Nagasawa, all of Sayama, Japan

[73] Assignee: Honda Giken Kogyo Kabushiki Kaisha, Tokyo, Japan

[21] Appl. No.: 355,454

[22] Filed: May 22, 1989

[51] Int. Cl.$^5$ .............................................. G05B 19/00
[52] U.S. Cl. ........................ 318/568.11; 318/568.10; 318/577; 318/567; 901/3; 901/20; 364/188; 395/1
[58] Field of Search ................. 318/560-638; 364/513, 193, 188, 190, 191, 192; 901/4, 9, 15, 18, 42, 47, 23, 26, 29, 37, 48, 3

[56] References Cited

U.S. PATENT DOCUMENTS

| | | | |
|---|---|---|---|
| 4,224,501 | 9/1980 | Lindbom et al. | 901/4 X |
| 4,420,812 | 12/1983 | Ito et al. | 318/573 X |
| 4,481,592 | 11/1984 | Jacobs et al. | |
| 4,517,652 | 5/1985 | Bennett et al. | 318/568.1 X |
| 4,553,077 | 11/1985 | Brantmark et al. | 318/567 X |
| 4,578,562 | 3/1986 | Lindstrom et al. | 901/3 X |
| 4,598,380 | 7/1986 | Holmes et al. | 901/20 X |
| 4,757,459 | 7/1988 | Lauchnor et al. | 364/193 X |
| 4,815,006 | 3/1989 | Andersson et al. | 901/9 X |
| 4,815,011 | 3/1989 | Mizuno et al. | 364/188 X |
| 4,819,184 | 4/1989 | Jonsson et al. | 901/3 X |
| 4,831,232 | 5/1989 | Andersson et al. | 318/577 |
| 4,835,710 | 5/1989 | Schnelle et al. | 318/568.11 X |

FOREIGN PATENT DOCUMENTS

| | | |
|---|---|---|
| 0067446 | 12/1982 | European Pat. Off. |
| 0076970 | 4/1983 | European Pat. Off. |
| 2027938 | 2/1980 | United Kingdom |
| 2154339 | 9/1985 | United Kingdom |
| 2166375 | 5/1986 | United Kingdom |

OTHER PUBLICATIONS

Radio Shack 1987 Catalog, pp. 130, 168, 169.
Radio Shack 1988 Catalog, pp. 124, 125, 166, 176.

*Primary Examiner*—Paul Ip

[57] ABSTRACT

A robot control system including a robot, a robot controller for controlling operation of the robot, and a teaching box for teaching the robot through the robot controller. The teaching box includes an input unit separate from the robot controller for entering a command signal to teach the robot its operation to be effected and a control unit for controlling the input unit and processing and for applying the command signal to the robot controller.

15 Claims, 12 Drawing Sheets

ROBOT CONTROL SYSTEM

BACKGROUND OF THE INVENTION

The present invention relates to a robot controlsystem, and more particularly to a robot control system having a robot controller for transferring control information, control data, etc. through dual-port RAMs between a plurality of CPUs for performing various control functions that are necessary to control operation of an industrial robot, and a teaching box for teaching the robot its operation by processing a command signal entered through an input means with a control means including the CPUs and supplying the processed signal to the robot controller.

Various industrial robots such as welding robots, paint coating robots, assembling robots, or the like are controlled by robot controllers. The robot controllers are required to perform more and more functions to meet recent requirements for more diverse, higher-speed, and more accurate specifications.

For welding a workpiece with a welding robot, for example, the workpiece is positioned on a jig by a clamp, and a welding current is controlled while a welding gun is being moved along a predetermined welding path over the workpiece. During such welding process, various parts of the welding robot are required to operate according to a given procedure, and have to be controlled for a next operation while their operations are being confirmed.

In order to accurately control complex movements of the robot and meet requirements for diversified objects to be controlled, there has been employed a robot control system for controlling a robot with a CPU according to an operation control program. Particularly, a robot control system of parallel distributed processing capability having a plurality of CPUs for carrying out various functions to control a robot is attracting much attention in view of its high cost performance.

In parallel distributed processing systems employing multiple CPUs, the CPUs are interconnected by bus lines. Therefore, the systems require drivers and receivers for sending signals to and receiving signals from the bus lines, and printed-circuit boards supporting the CPUs and their peripherals. Therefore, these parallel distributed processing systems have a large number of hardware parts, and suffer the problems of low processing speeds and low reliability because of a required degree of connection reliability, a bus priority structure for giving the CPUs bus control, and complex control processing operation.

Transfer of control information between the CPUs is effected using a common random-access memory under time-division interrupt control. Consequently, a certain period of time must be consumed for each CPU to effect interrupt processing for saving and restoring data, and the production of a program for such time-division interrupt control is complicated.

To employ a welding robot to carry out a certain welding operation on a workpiece, it is necessary to move a welding gun mounted on the end of a robot arm along a predetermined welding path. The welding path is generally taught as teaching data to the welding robot by a teaching box. In a welding cycle, the welding robot is controlled by a robot controller based on the teaching data. The teaching box for teaching the welding robot its operation has input means for selecting command values for driving axes of the robot and a coordinate system serving as a reference for the teaching process, and setting means for setting operational speeds of the robot. The operator operates these means according to a given procedure to teach the welding robot.

Heretofore, the teaching box is controlled by a CPU in the robot controller, and functions merely as an input unit for the robot controller. In recent years, robots are required to perform an ever increasing number of functions, and hence robots should be taught many operations by their teaching boxes, with the result that the procedure for operating the teaching boxes is quite complex. Accordingly, since more input and setting means are used on teaching boxes, the teaching boxes cannot efficiently be operated, and the processing of signals transferred between the teaching box and the robot controller is complex. Another drawback is that the multifunctions of a robot place an increased burden on its robot controller.

SUMMARY OF THE INVENTION

It is a general object of the present invention to provide a robot control system having a robot controller including a plurality of CPUs connected by dual-port RAMs for distributively performing various control functions necessary to control operation of a robot, so that the CPUs are not required to be connected by bus lines and control information can be transferred between the CPUs at a high speed for increasing the speed of operation of the robot.

Another object of the present invention is to provide a robot control system having a teaching box including an input means for entering command signals which are processed by a control means incuding CPUs and supied to a robot controller, so that multiple functions of a robot can be performed without increasing the burden on the robot controller, and the teaching box can easily be operated.

Still another object of the present invention is to provide a robot control system comprising: a robot; a robot controller for controlling operation of said robot a teaching box for teaching said robot through said robot controller; and said teaching box comprising: input means separate from said robot controller for entering a command signal to teach the robot its operation to be effected and control means for controlling said input means and processing and applying said command signal to said robot controller.

Yet another object of the present invention is to provide a robot control system wherein said control means comprises means for applying said command signal as a serial signal to said robot controller.

Yet still another object of the present nvention is to provide a robot control system wherein said input means comprises at least a ten-key pad or a joystick.

A further object of the present invention is to provide a robot control system wherein said control means comprises at least a CPU.

A still further object of the present invention is to provide a robot control system wherein said teaching box further comprises output means comprising an LCD.

A yet further object of the present invention is to provide a robot control system wherein said input means comprises a joystick having on a distal end thereof a pushbutton switch for operating said robot.

A yet still further object of the present invention is to provide a robot control system wherein said teaching box comprises a main body in the form of a rectangular parallelepiped and a display, said input means and said control means being disposed in said main body, said main body having a pair of arms projecting obliquely upwardly therefrom, said display comprising an LCD angularly movably supported between said arms.

It is also an object of the present invention to provide a robot control system comprising: a robot having an actuator system; and a robot controller for controlling operation of said robot, said robot controller comprising: an I/O processing unit for sending signals to and receiving signals from external units; a servo control unit for controlling said actuator system; a main processing unit; a first dual-port RAM interconnecting said main processing unit and said I/O processing unit; a second dual-port RAM interconnecting said main processing unit and said servo control unit, and said I/O processing unit, said servo control unit, and said main processing unit including CPUs, respectively, said CPUs sending and receiving control information through said first and second dual-port RAMs.

Another object of the present invention is to provide a robot control system wherein said robot comprises a welding robot, further including a sequencer and a welding controller connected to said I/O processing unit, and a hydraulic unit, said servo control unit being connected directly and through said hydraulic unit to said welding robot, said welding controller being connected to said welding robot.

Still another object of the present invention is to provide a robot control system comprising: a robot having an actuator system; a robot controller for controlling operation of said robot; and a teaching box for teaching said robot through said robot controller, said robot controller comprising: an I/O processing unit for sending signals to and receiving signals from external units; a servo control unit for controlling said actuator system; a main processing unit; a first dual-port RAM interconnecting said main processing unit and said I/O processing unit; a second dual-port RAM interconnecting said main processing unit and said servo control unit, and said I/O processing unit, said servo control unit, and said main processing unit including CPUs, respectively, said CPUs sending and receiving control information through said first and second dual-port RAMS, said teaching box comprising: input means separate from said robot controller for entering a command signal to teach the robot its operation to be effected, and control means for controlling said input means and processing and applying said command signal to said I/O processing unit.

The above and other objects, features and advantages of the present invention will become more apparent from the following description. However, it should be ntoed that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
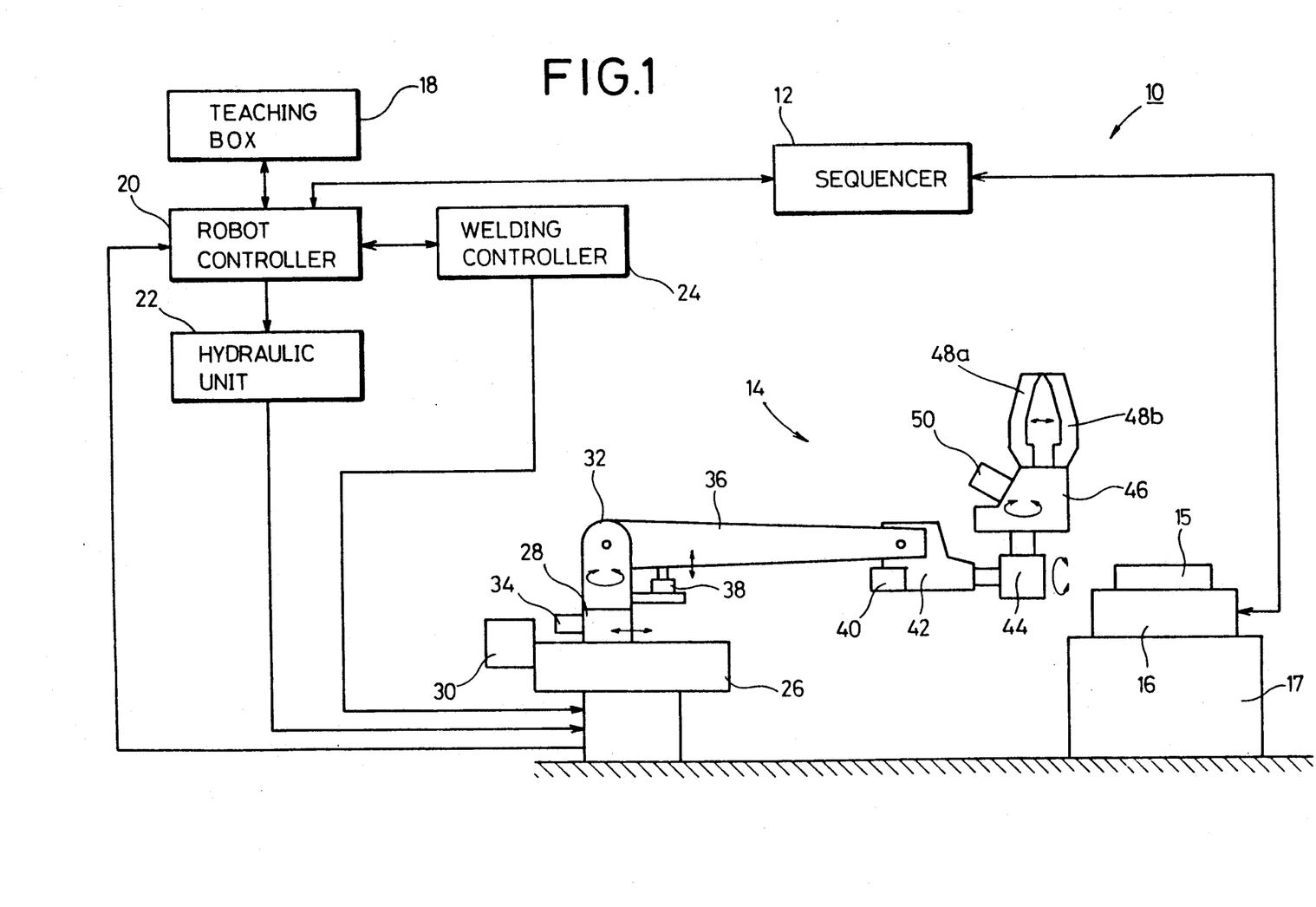
FIG. 1 is a schematic elevational view, partly in block form, of a welding system incorporating a robot control system according to the present invention.

FIG. 1 schematically illustrates, partly in block form, a welding system incorporating a robot control system according to the present invention.

The welding system, generally indicated at 10, includes a welding robot 14 which is operated under sequence control by a sequencer 12 for welding a workpiece 15 positioned on a jig 17 by a clamp unit 16. The welding robot 14 is taught its operation in advance by a teaching box 18, and controlled in its operation by a robot controller 20 through a hydraulic unit 22 and a welding controller 24

The welding robot 14 is mounted on a base 26 and, includes a movable member 28 which is movably disposed on the base 26 and movable in the directions indicated by the arrows by a hydraulic motor 30 disposed on the base 26, and a swingable member 32 swingably mounted on the movable member 28 and swingable in the directions indicated by the arrows by a hydraulic motor 34 attached to the movable member 28. An arm 36 has an end pivotally coupled to the swingable member 32 and is vertically movable in the directions of the arrows by a hydraulic cylinder 38 supported by the swingable member 32. A first attachment member 42 supporting a hydraulic motor 40 is mounted on the other free end of the arm 36, and a second attachment member 46 is coupled to the first attachment member 42 through a hydraulic motor 44. The second attachment member 46 is rotatable by the hydraulic motor 40 in the directions indicated by the arrows about an axis of the hydraulic motor 44, and is also rotatable by the hydraulic motor 44 in the directions of the other arrows about another axis of the hydraulic motor 44. A pair of gun arms 48a, 48b is attached to the second attachment member 46, the gun arms 48a, 48b being movable toward and away from each other, i.e., closable and openable, by a hydraulic cylinder 50 mounted on the second attachment member 46. The hydraulic unit 22 controls operation of the hydraulic motors 30, 34, 40, 44 and the hydraulic cylinder 38. The welding controller 24 controls operation of the hydraulic cylinder 50 and also an electric current flowing between the distal ends of the gun arms 48a, 48b.

Figure 2:
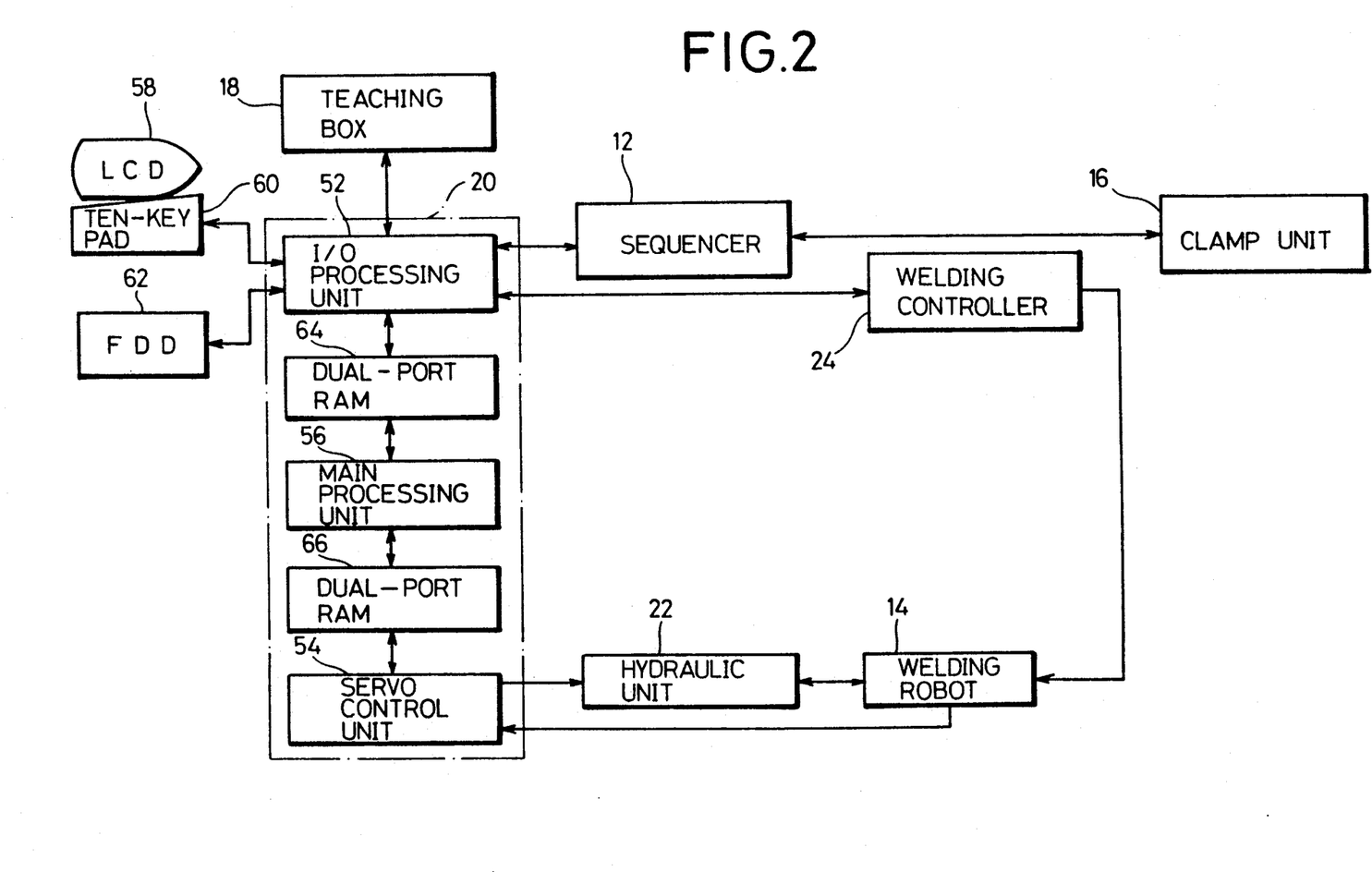
FIG. 2 is a detailed block diagram of the welding system shown in FIG. 1.

The robot controller 20 is constructed as shown in FIG. 2. The robot controller 20 basically comprises an I/O processing unit 52 for transferring control information, control data, etc. between itself and external units such as the teaching box 18, the sequencer 12, and the welding controller 24; a servo control unit 54 for sending drive signals based on teaching data or a working program to the hydraulic systems of the welding robot 14 through the hydraulic unit 22 and for receiving response signals directly from the welding robot 14; and a main processing unit 56 for sending and receiving necessary control information and control data to and from the I/O processing unit 52 and the servo control unit 54 to control operation of the welding system 10 in its entirety, and for generating and processing teaching data. The I/O processing unit 52, the servo control unit 54, and the main control unit 56 have respective CPUs (central processing units) comprising microprocessors capable of processing data independenly. To the I/O processing unit 52, there are connected an LCD (liquid-crystal display) 58, a ten-key pad 60, and a floppy disc drive 62 for data transfer therebetween.

The I/O processing unit 52 and the main processing unit 56 are connected to each other by a first dual-port RAM 64, and the main processing unit 56 and the servo control unit 54 are connected to each other by a second dual-port RAM 66. Control information and control data are transferred between the I/O processing unit 52, the main processing unit 56, and the servo control unit 54 through these dual-port RAMs 64, 66.

The I/O processing unit 52, the main processing unit 56, the servo control unit 54, and the dual-port RAMs 64, 66 are integrally mounted on a main printed-circuit board. The control information and control data are transferred through the dual-port RAMs 64, 66. The dual-port RAMs 64, 66 serve as a common memory in a conventional multiple-CPU system.

Figure 3:
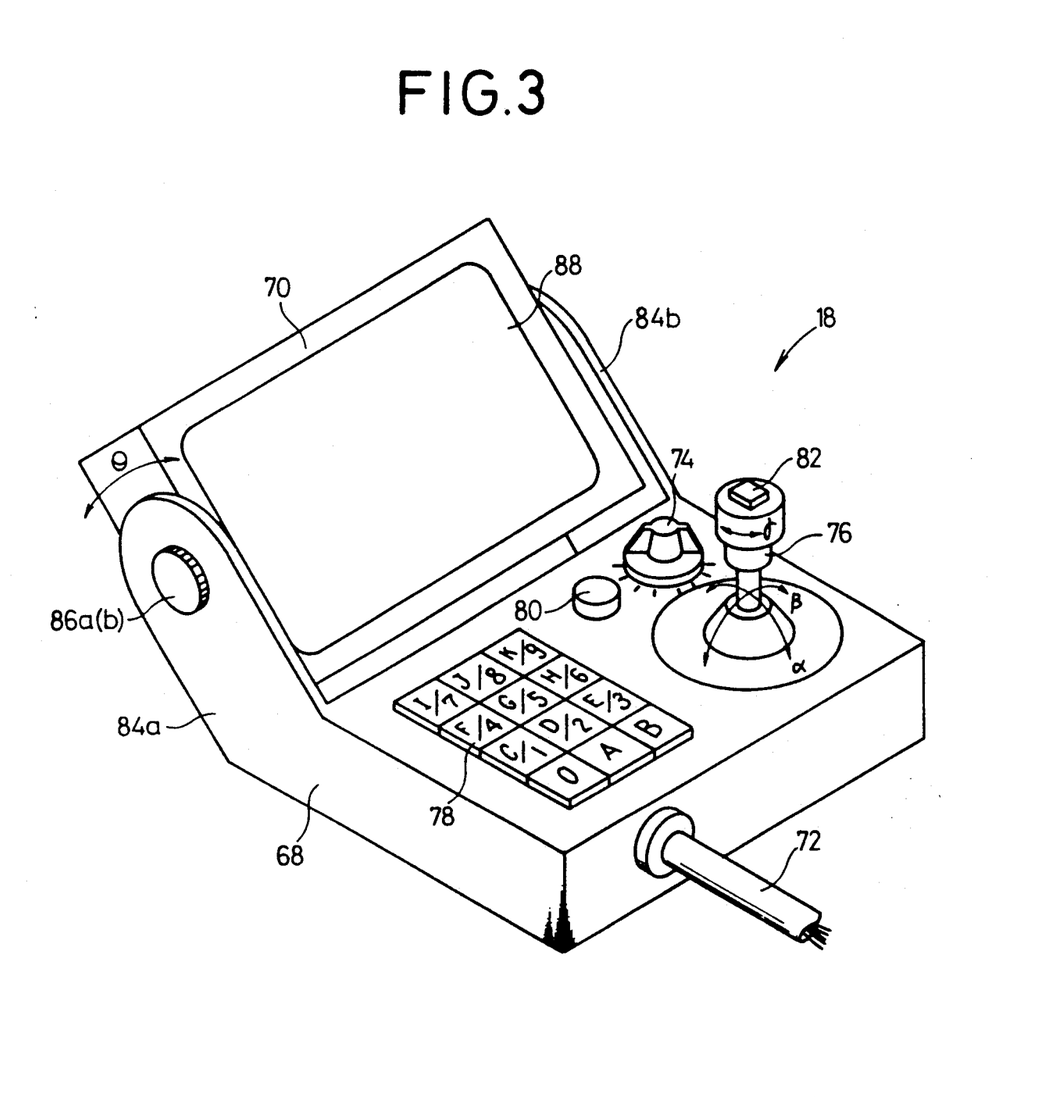
FIG. 3 is a perspective view of a teaching box of the welding system of the present invention.

The teaching box 18 is arranged as shown in FIG. 3. The teaching box 18 essentially comprises a main body 68 having an outer profile in the shape of a rectangular parallelepiped and housing a circuit therein for teaching the welding robot 14, and a display 70 for displaying procedures or modes of operation of the teaching box 18.

The main body 68 is electrically connected to the robot controler 20 through a cable 72. The main body 68 has on its upper panel a mode selection switch 74 for switching between teaching and playback modes, a joystick 76 for manually operating the welding robot 14, a ten-key pad 78 for selecting functions and entering data, and an emergency stop button 80 for stopping operation of the welding robot 14 in an emergency. The joystick 76 is tiltable in the directions indicated by the arrows α, β, and also rotatable in the directions indicated by the arrows γ. The relationship between the direction in which the joystick 76 is tilted or rotated and the direction in which the welding robot 14 is operated can be determined through the ten-key pad 78. The speed of operation of the welding robot 14 is selected by the angle through which the joystick 76 is tilted or rotated. A push-button switch 82 is mounted on the upper end of the joystick 76 and can be depressed to start operating the welding robot 14.

The main body 68 has two laterally spaced arms 84a, 84b projecting obliquely upwardly. The display 70 is angularly movably supported between the distal ends of the arms 84a, 84b by attachment screws 86a, 86b, the display 70 being angularly movable about the screws 86a, 86b in the directions indicated by the arrows θ. The display 70 has an LCD 88 which displays a procedure of operation of the teaching box 18 which has been selected by the mode selection switch 74 and the ten-key pad 78.

Figure 4:
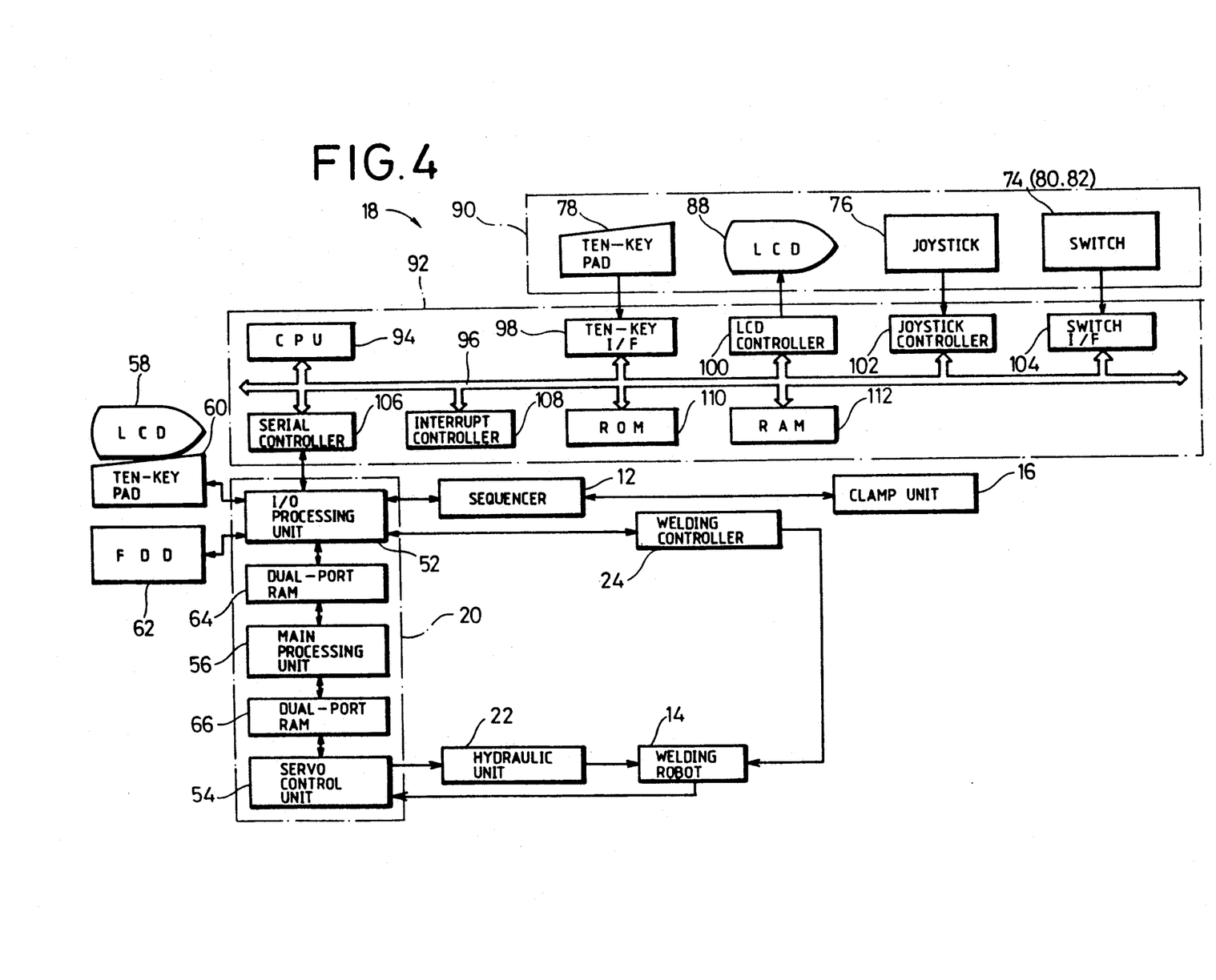
FIG. 4 is a detailed block diagram of the welding system, including the teaching box.

As shown in FIG. 4, the teaching box 18 comprises an input/output unit 90 and a control unit 92 which are controlled by a CPU 94 as a control means in the control unit 92. To the CPU 94, there are connected through a bus line 96 a ten-key interface 98, an LCD controller 100, a joystick controller 102, a switch interface 104, a serial controller 106, an interrupt controller 108, a ROM 110, and a RAM 112. The ten-key interface 98, the LCD controller 100, and the joystick controller 102 control the ten-key pad 78 as an input means, the LCD 88 as an output means, and the joystick 6 as an input means. The switch interface 104 controls the mode selection switch 74, the emergency stop button 80, and the push-button operation switch 82 as input means. The serial controller 106 controls the transfer of serial data between the teaching box 18 and the robot controller 20. When the emergency stop button 80 is depressed, the interrupt controller 108 causes an interrupt in the operation of the CPU 94 to stop the operation of the welding robot 14 in an emergency.

Figure 5:
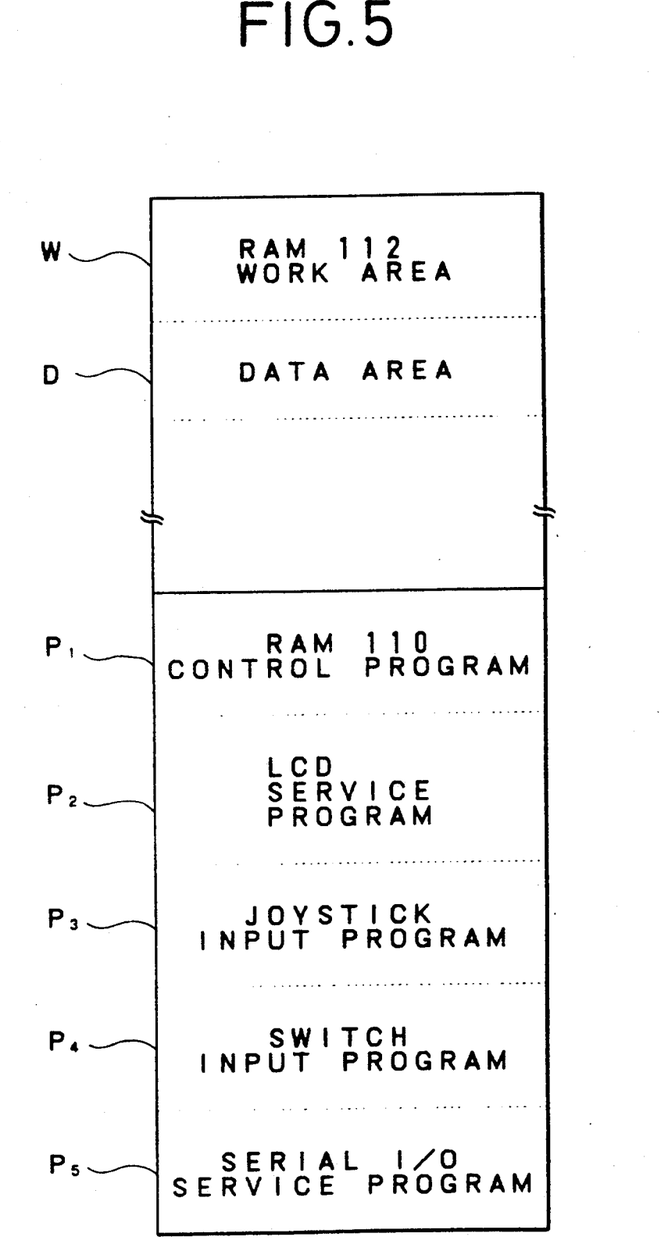
FIG. 5 is a diagram of a memory map in the teaching box of the welding system.

The ROM 110 and the RAM 112 store predetermined programs and teaching data for the welding robot 14. As shown in FIG. 5, the ROM 110 stores a control program $P_1$ for controlling the teaching box 18, an LCD service program $P_2$ for displaying procedures or modes of operation of the teaching box 18 on the LCD 88, a joystick input program $P_3$ for processing input data from the joystick 76, a switch input program $P_4$ for processing input data from the mode selection switch 76, the emergency stop button 80, and the operation switch 82, and a serial I/O service program $P_5$ for controlling the transfer of serial data between the teaching box 18 and the robot controller 20. These programs $P_1$ through $P_5$ are executed by the CPU 94. The RAM 112 has a work area W and a data area D for storing teaching data prepared for the welding robot 14 by using the teaching box 18

The welding system 10 incorporating the robot control system of the present invention is basically constructed as described above. Operation and advantages of the welding system 10 will hereinafter be described.

First, the power supply of the teaching box 18 is turned on. The CPU 94 of the teaching box 18 then displays a main menu 114 shown in FIG. 6 on the LCD 88 through the LCD controller 100 based on the LCD service program $P_2$ stored in the ROM 110.

Figure 6:
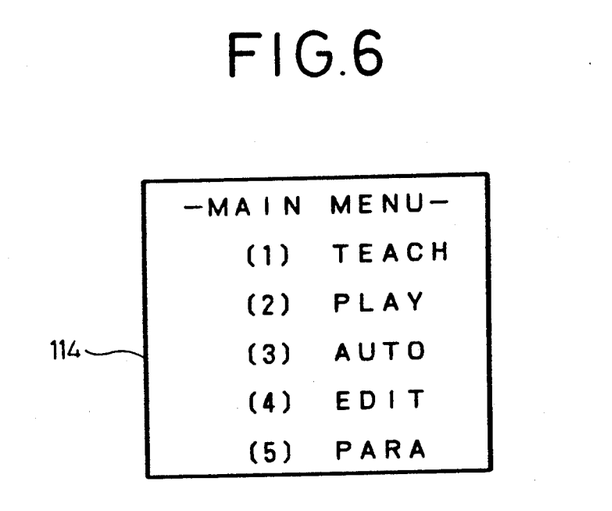
FIG. 6 is a view of a menu displayed on the teaching box.

The main menu 114 includes "TEACH" which indicates a teaching mode for teaching the welding robot 14 by using the joystick 76, "PLAY" which indicates a playback mode for fetching desired teaching data by using the ten-key pad 60 coupled to the robot controller 20 and for operating the welding robot 14 according the teaching data, "AUTO" which indicates an automatic mode for automatically executing the playback mode based on a request from the sequencer 12 actually to weld the workpiece 15 with the welding robot 14, "EDIT" which indicates an editing mode for editing (i.e., three-dimensionally shifting, copying, or the like) teaching data stored in the teaching box 18, and "PARA" which indicates a parameter setting mode for setting certain parameters with respect to the welding robot 14.

Then, the operator selects the teaching mode from the displayed main menu 114 and turns the mode selection switch 74 to position "1". The CPU 94 executes the LCD service program P, based on the switch input program P₄ to display a teaching mode menu on the LCD 88. The teaching mode menu indicates procedures or modes of how to operate the joystick 76. For example, it indicates information about which part of the welding robot 1 is driven according to what coordinate system by selecting which key of the ten-key pad 78 if the joystick 76 is tilted.

A desired mode is selected from the teaching mode menu displayed on the LCD 88, and the ten-key pad 78 is operated. Then, the operator tilts or turn the joystick 76 for desired intervals or distances in the directions of the arrows $\alpha$, $\beta$, and $\gamma$ while depressing the operation switch 82. Data representing the directions in which the joystick 76 is tilted and turned and th angles through which the joystick 76 is tilted and turned are transferred from the joystick controller 102 to the serial controller 106 according to the joystick input program P₃ executed by the CPU 94. The serial controller 106 is controlled by the CPU 94 according to the serial I/O service program P₅ to transfer the data as serial data to the robot controller 20. Therefore, since the data can be transferred as serial data, the cabe 72 interconnecting the teaching box 18 and the robot controller 20 may be of a simple construction irrespective of the multiple functions to be performed by the teaching box 18.

The data transferred to the robot controller 20 are then transferred through the I/O processing unit 52 and the dual-port RAM 64 to the main processing unit 56. Based on the mode selected from the teaching mode menu, the main processing unit 56 generates pulse signals corresponding to the intervals or distances by which the axes of the welding robot 14 are to be driven, and applies the generated pulse signals through the dual-port RAM 66 and the servo control unit 54 to the hydraulic unit 22. In response to the supplied pulse signals, the hydraulic unit 22 moves the distal ends of the gun arms 48a, 48b of the welding robot 14 to a desired area of the workpiece 15 which is to be welded. Since the data transferred from the teaching box 18 have already been processed to match the robot controller 20 by the CPU 94 in the teaching box 18, the burden on the robot controller 20 is reduced, and the robot controller 20 is easily capable of meeting requirements for a greater number of functions to be performed by he weding robot 14.

After the operator has confirmed that the welding robot 14 has moved to the desired area of the workpiece 15, the operator enters a command for storing the teaching data through the ten-key pad 78 of the teaching box 18. The present positional data of the axes of the welding robot 14 are now transferred under the control of the CPU 94 to the RAM 112 in the teaching box 18 through the I/O processing unit 52 of the robot controller 20.

The above cycle of operation is repeated until the teaching process is finished. Then, the operator controls the teaching box 18 to display the main menu 114 shown in FIG. 6 on the LCD 88. Then, the mode selection switch 74 is turned to position "2" to select the playback mode for playing back the welding robot 14 in order to confirm the teaching data. At this time, the CPU 94 in the teaching box 18 displays a playback mode menu on the LCD 88 based on the LCD service program P₂. The playback mode menu indicates various ways or modes of processing the teaching data, e.g., a mode of executing the teaching data step by step, a mode of executing the teaching data by one cycle, etc. The operator selects a desired mode from the playback mode menu, and plays back the welding robot 14 based on the teaching data.

After the operator has confirmed that the welding robot 14 has moved according to the teaching data, the operator controls the teaching box 18 to display the main menu 114 on the LCD 88. Then, the mode selection switch 74 is turned to position "3" to select the automatic mode. The welding robot 14 is now controlled by the sequencer 12 to effect a desired welding operation on the workpiece 15 based on the teaching data. If the operator finds any abnormal condition or welding failure while the welding robot 14 is in operation, then the emergency stop button 80 of the teaching box 18 is depressed by the operator to enable the interrupt controller 108 to cause an interrupt in the operation of the CPU 94 and issue an operation stop command to the robot controller 20, which then stops the operation of the welding robot 14.

Figure 7:
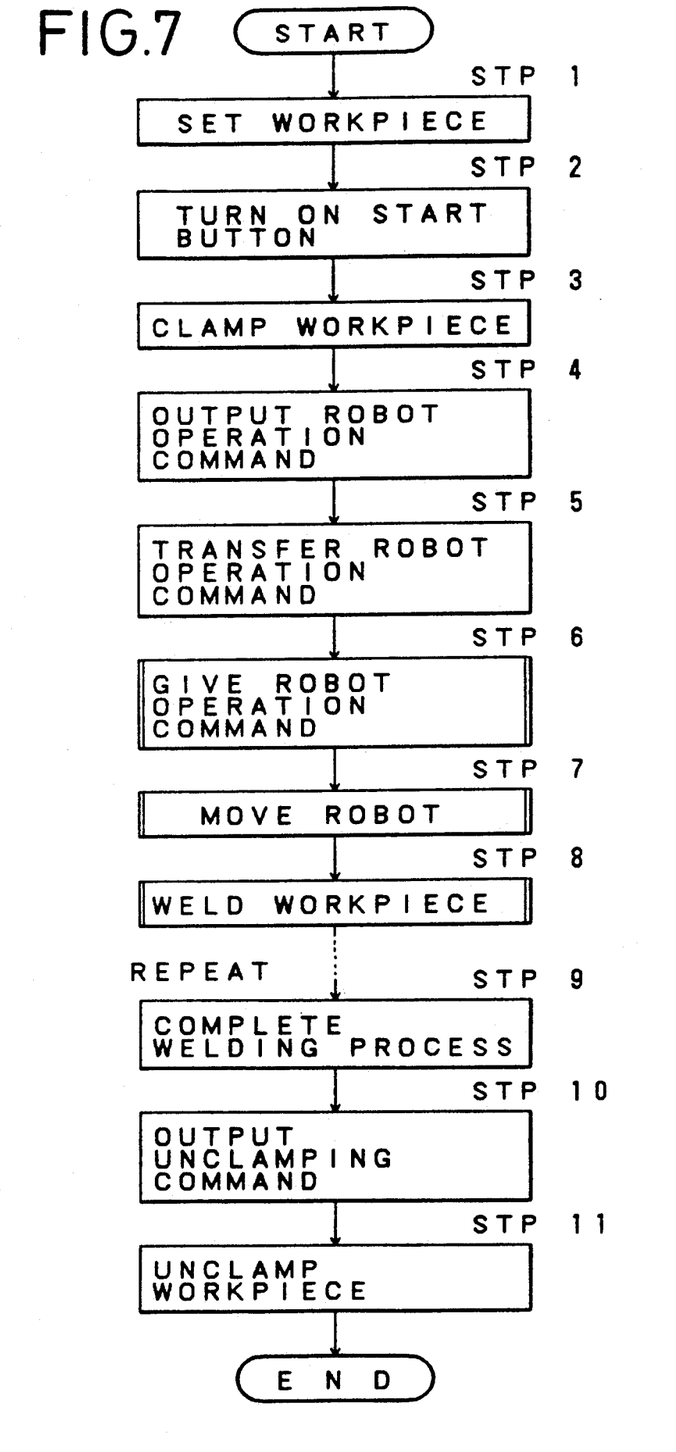
FIG. 7 is a flowchart of an operation sequence of the welding system.

FIG. 7 shows a detailed operation sequence of the welding system 10 when the automatic mode is selected. First, the workpiece 15 is set on the jig 17 in a step 1. Then, a start button (not shown) is pushed to start the welding system 10 including the robot controller 20 in a step 2. When the welding system 10 is started, the clamp unit 16 is operated to clamp the workpiece 15 on the jig 17 based on an operation command from the sequencer 12. At this time, the output signal from a limit switch (not shown) which indicates the operating condition of the clamp unit 16 becomes ON in a step 3. In response to detection of the ON signal from the limit switch, the sequencer 12 issues an operation command for the welding robot 14 to the robot controller 20 in a step 4.

Figure 8:
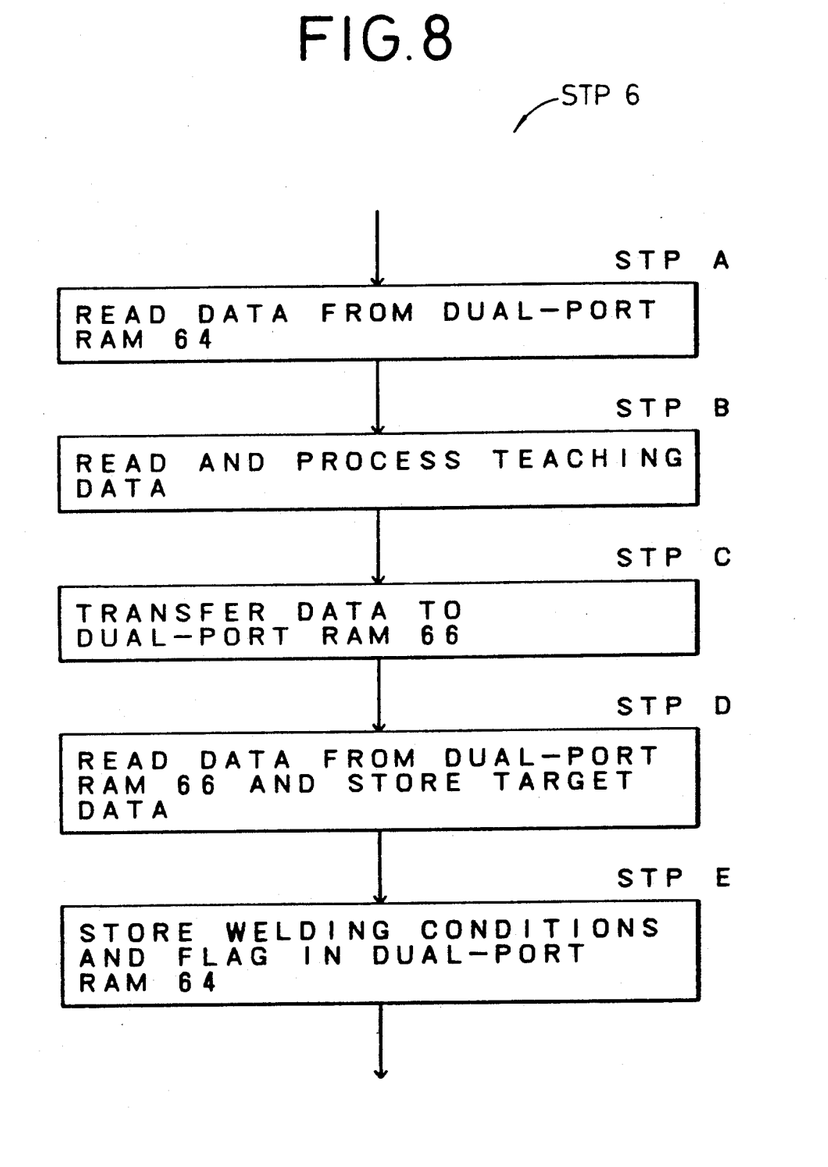
FIG. 8 is a detailed flowchart of a step 6 in the operation sequence of FIG. 7.

The robot controller 20 in turn transfers the operation command to the servo control unit 54 through the I/O processing unit 52, the dual-port RAM 64, the main processing unit 56, and the dual-port RAM 66 in a step 5. Then, the servo control unit 54 applies the operation command to the welding robot 14 in a step 6. The welding robot 14 is moved to a position indicated by the operation command in a step 7, and welds the workpiece 15 under the control of the welding controller 24 in the indicated position in a step 8. The steps 7 and 8 ar repeated in each desired welding spot on the workpiece 15. After the workpiece 15 has been welded at all welding spots, the servo control unit 54 delivers an operation completion signal to the sequencer 12 through the I/O processing unit 52 in a step 9. The sequencer 12 applies an unclamping command to the clamp unit 16 in a step 10, after which the workpiece 15 is released from the clamp unit 16 in a step 11. The entire welding process is now finished FIG. 8 illustrates a detailed operation sequence of the step 6 shown in FIG. 7. It is assumed here that the automatic mode is selected in the robot controller 20 when the welding system 10 is started (see the step 2 in FIG. 7), and certain teaching data for the welding robot 14 are selected or specified. All steps in FIG. 8 are executed in the main processing unit 56.

The main processing unit 5 reads input data entered from the sequencer 12 out of the dual-port RAM 64 between the I/O processing unit 52 and the main processing unit 56 in a step A. Then, the main processing unit 56 reads the teaching data stored in a work area in a RAM (not shown) in the main processing unit 56, determines whether it is necessary to interpolate or otherwise process the teaching data, and interpolates the teaching data if necessary in a step B. The input data entered from the sequencer 12 or the teaching data obtained in the step B are transferred to the dual-port RAM 66 between the main processing unit 56 and the servo control unit 54 in a step C. The main processing unit 56 reads the present position data of the respective axes of the welding robot 14, which are stored in the dual-port RAM 66 by the servo control unit 54, compares the positional data with target positions, and stores next target data in the dual-port RAM 66 if the difference is zero, in a step D. Then, when the various parts of the welding robot 14 reach the welding position according to the command, welding conditions for the welding controller 24 and flag data issued to a welding timer are stored in the dual-port RAM 64 in a step E. In this manner, control information and control data are transferred between the I/O processing unit 52 and the main processing unit 56 and between the main processing unit 56 and the servo control unit 54 through the dual-port RAMs 64, 66. Since the I/O processing unit 52, the main processing unit 56, and the servo control unit 54 are connected to each other by the dual-port RAMs 64, 66, the data can be processed simultaneously in parallel by the I/O processing unit 52, the main processing unit 56, and the servo control unit 54 for high-speed operation.

Figure 9:
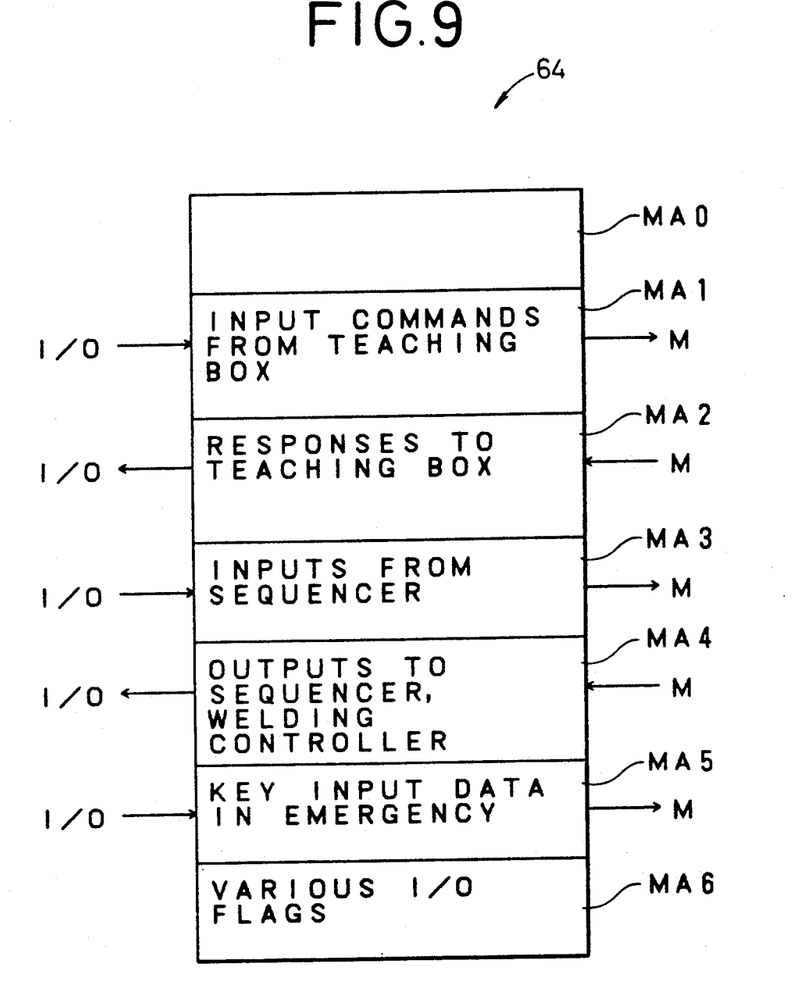
FIGS. 9 and 10 are diagrams of memory maps indicating memory areas in dual-port RAMS.
Figure 10:
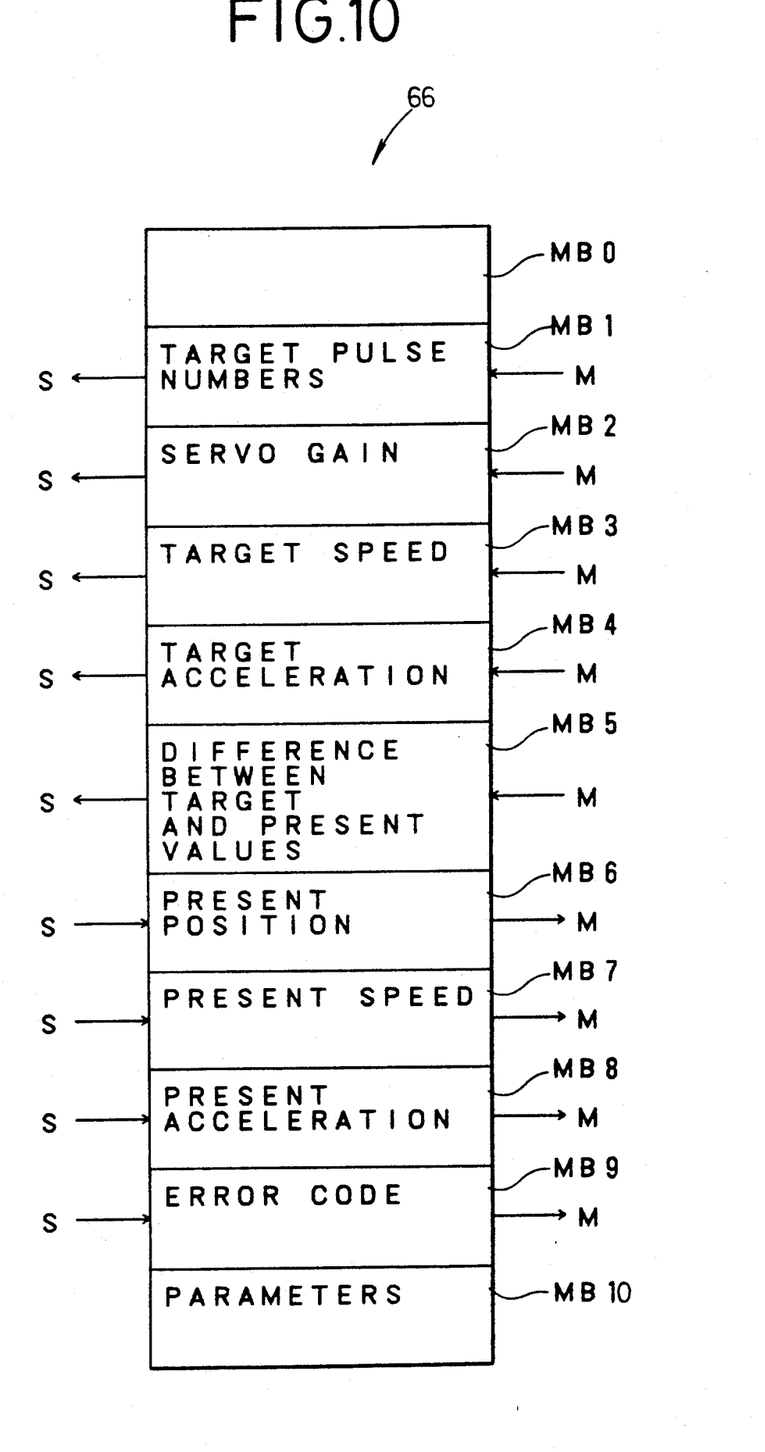

The dual-port RAMs 64, 66 have memory areas as shown in FIGS. 9 and 10. As shown in FIG. 9, the dual-port RAM 64 connected between the I/O processing unit 52 and the main processing unit 56 has memory areas MA0 through MA6. The memory area MA1 stores input commands from the teaching box 18. The input commands are written by the I/O processing unit 52 (see I/O in FIG. 9), and read, when required, by the main processing unit 56 (see M in FIG. 9). The memory area MA2 stores responses to the input commands, the responses being written by the main processing unit 56 and read, when required, by the I/O processing unit 52. The memory area MA3 stores input signals from the sequencer 12. The data stored in the memory area MA3 are transferred from the I/O processing unit 52 to the main processing unit 56. The memory area MA4 stores output signals to be sent to the sequencer 12 and the welding controller 24. The data stored in the memory area MA4 ar transferred from the main processing unit 56 to the I/O processing unit 52. The memory area MA5 stores data entered by keys in an emergency, and the memory area MA6 stores flag information for the various I/Os.

As shown in FIG. 10, the dual-port RAM 66 connected between the main processing unit 56 and the servo control unit 54 has memory areas MB0 through MB10. The memory areas MB1 through MB5 store operation instruction data for the welding robot 14, the data being written by the main processing unit 56 (see M in FIG. 10) and read, when required, by the servo control unit 54 (see S in FIG. 10). More specifically, the memory area MB1 stores the numbers of target pulses to be supplied to the respective axes, the target pulse numbers being calculated from the teaching data by the main processing unit 56. The memory area MB2 stores command values, determined by the main processing unit 56, for the servo gains of servoamplifiers corresponding to the robot axes. The memory area MB3 stores a target speed determined by the main processing unit 56. The memory area MB4 stores a target acceleration determined by the main processing unit 56. The memory area MB5 stores data on the difference between a target value and a present value, which is determined by the main processing unit 56. The memory areas MB6 through MB9 store present data on operation of various parts of the welding robot 14, the data being written by the servo control unit 54 and read, when required, by the main processing unit 56. More specifically, the memory area MB6 stores data on the present positions of the axes, the memory area MB7 a present speed, the memory area MB8 a present acceleration, and the memory area MB9 an error code generated by the servo control unit 54. The memory area MB10 stores parameters such as upper and lower limit values for the axes, and maximum allowable deviations for the axes, etc.

Figure 11:
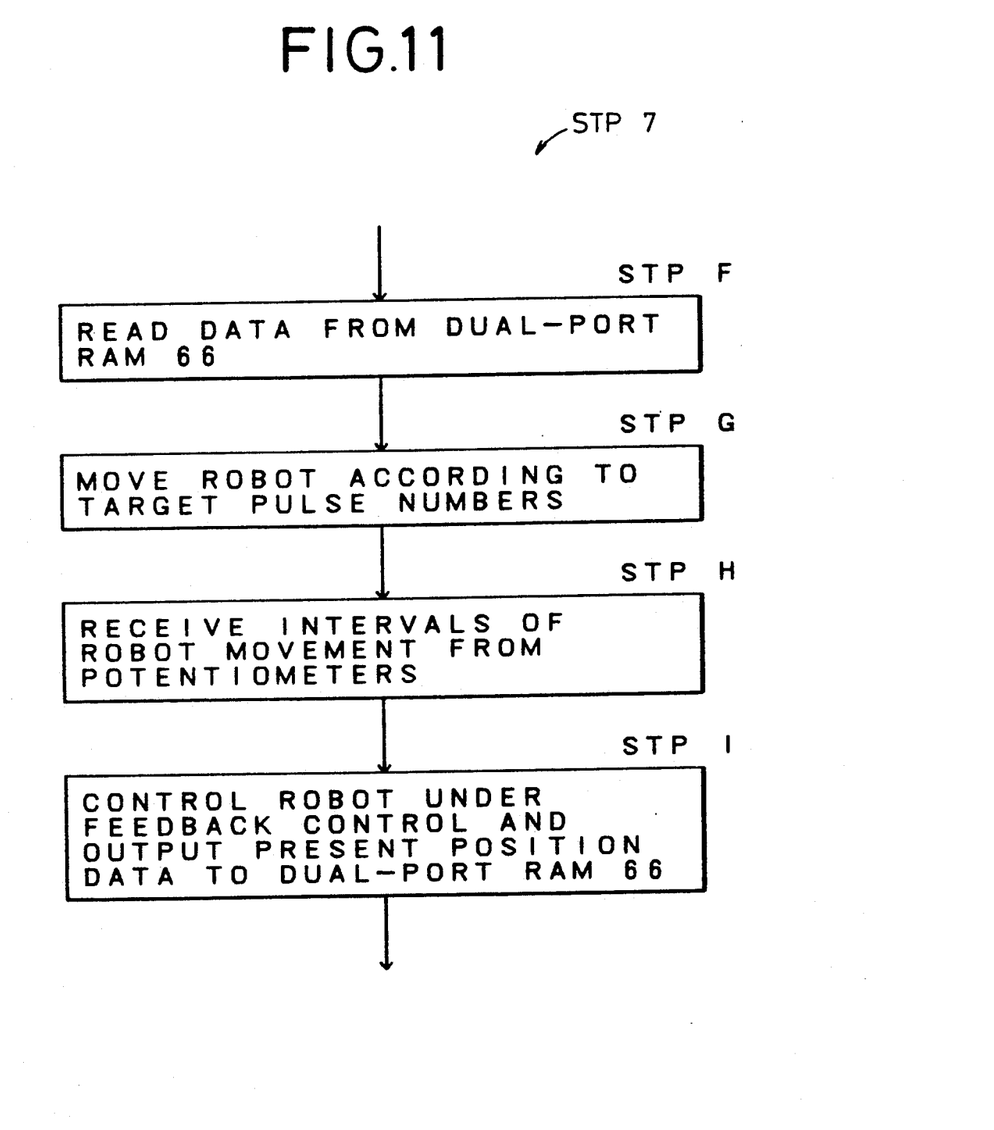
FIGS. 11 and 12 are detailed flowcharts of steps 7 and 8, respectively, in the operation sequence of FIG. 7.

The steps 7 and 8 in the flowchart of FIG. 7 will be described in greater detail. FIG. 11 shows a detailed operation sequence of the step 7 in FIG. 7, for moving the welding robot 14 to a given position under the control of the servo control unit 54.

The command data such as the target pulse numbers for the axes of the welding robot 14, the servo gain, the target speed, and the target acceleration are read from the memory areas MB1 through MB4 (FIG. 10) of the dual-port RAM 66 in a step F. Then, the target pulse numbers based on the command data are sent to the hydraulic unit 22, which applies corresponding signals to the servoamplifiers to move the welding robot 14 to a target position in a step G. The distances or intervals of movement from potentiometers corresponding to the axes of the welding robot 14 are entered through the hydraulic unit 22 to the servo control unit 54 in a step H. Based on the inputs from the potentiometers, the servo control unit 54 calculates the difference between the target and preset values, applies the difference as feedback data to the hydraulic unit 22, and also calculates present data on the present position, the present speed, and the present acceleration, and stores them into the memory areas MB6 through MB8 in the dual-port RAM 66 in a step I.

Figure 12:
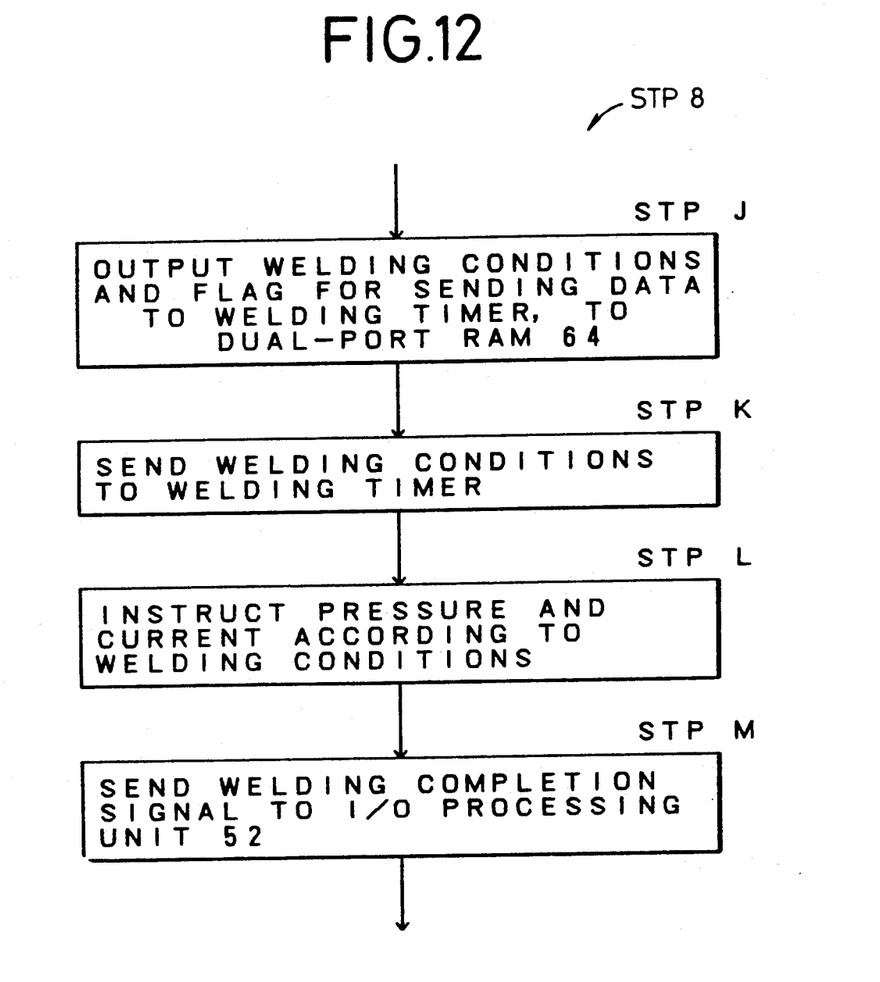

FIG. 12 shows a detailed operation sequence of the step 8 shown in FIG. 7. The flowchart of FIG. 12 has a step J indicating operation of the main processing unit 56, a step K indicating operation of the I/O processing unit 52, and steps L, M indicating operation of the welding controller 24. The operation sequence of FIG. 12 enables the welding robot 14 that has moved to the given welding position to weld the workpiece 15 under the control of the welding controller 24.

After the welding robot 14 has reached the welding position ind cated by the teaching data under the control of the servo control unit 54 (i.e., after the target and present positions have agreed with each other), welding conditions for the welding controller 24 and a flag for issuing data to the non-illustrated welding timer are stored in the memory area MA4 in the dual-port RAM 64 in the step J. Then, the I/O processor 52 reads the flag from the dual-port RAM 64, and sends the flag together with the welding conditions to the welding controller 24 which has the non-illustrated welding timer, in the step K. The welding controller 24 instructs a pressure and a current to control the gun arms 48a, 48b under the welding conditions from the I/O processing unit 52, for thereby welding the workpiece 15, in the step L. When the welding process is over, a welding completion signal is sent from the welding controller 24 to the I/O processing unit 52 in the step M.

After the workpiece 15 has been welded at all welding spots, the steps 9 through 11 (see FIG. 7) are executed, and the operation of the welding system is finished.

With the present invention, as described above, the transfer of data between the I/O processing unit which sends signals to and receive signals from the parts of the robot, the servo control unit which contros the hydrauic systems of the robot, and the main processing unit is effected through the dual-port RAMs. Therefore, the robot control system no longer requires a printed-circuit board supporting drivers for sending signals to bus lines, receivers for receiving signals from the bus lines, processors, and their peripherals, and is therefore of simplified hardware. The speed and reliability of operation of the robot control system are increased because the robot control system does not require connection reliability, a bus priority structure for giving the CPUs bus control, and complex control processing operation.

The teaching box for teaching the robot through the robot controller has input and output means such as the joystick, LCD, etc., and control means including at least the CPU. Accordingly, the requirement for multi-functions of the robot can easily be met without increasing the burden on the robot controller. Since the teaching box is easy to handle, the robot control system is highly efficient in operation.

Athough a certain preferred embodiment has been shown and described, it should be understood that many changes and modifications may be made therein without departing from the scope of the appended claims. Such variations are not to be regarded as a departure from the spirit and scope of the invention, and all such modifications as would be obvious to one skilled in the art are intended to be included within the scope of the following claims.

What is claimed is:

1. A robot control system comprising:
   a robot having an actuator system;
   a robot controller for controlling operation of said robot, said robot controller comprising
      an I/O processing unit for sending signals to and receiving signals from external units,
      a servo control unit for controlling said actuator system,
      a main processing unit for controlling the robot control system,
      a first dual-port RAM, having a plurality of memory areas therein, interconnecting said main processing unit and said I/O processing unit, and
      a second dual-port RAM, having a plurality of memory areas therein, interconnecting said main processing unit and said servo control unit,
      wherein said I/O processing unit, said servo control unit, and said main processing unit each include respective CPUs, said CPUs sending and receiving control information through said first and second dual-port RAMs; and
   a teaching box for teaching said robot through said robot controller, said teaching box comprising
      input means separate from said robot controller for entering a command signal to teach said robot an operation to be effected, and
      control means, including a processing means, for controlling said input means and for processing and applying said command signal to said robot controller.

2. A robot control system according to claim 1, said control means comprising means for applying said command signal as a serial signal to said robot controller.

3. A robot control system according to claim 1, said control means comprising at least a ten-key pad or a joystick.

4. A robot control system according to claim 1, comprising said teaching box further comprises output means comprising an LCD.

5. A robot control system according to claim 1, comprising said input means comprises a joystick having on a distal end thereof a push-button switch for operating said robot.

6. A robot system according to claim 5, said teaching box comprising:
   a main body in the form of a rectangular parallelpiped; and
   a display,
   said input means and said control means being disposed in said main body, said main body having a pair of arms projecting obliquely upwardly therefrom, and said display comprising said LCD angularly movably supported between said arms.

7. A robot control system comprising:
   a robot having an actuator system; and
   a robot controller for controlling operation of said robot,
   said robot controller comsisting of
      an I/O processing unit for sending signals to and receiving signals from external units,
      a servo control unit for controlling said actuator system,
      a main processing unit,
      a first dual-port RAM, having a plurality of memory areas therein, interconnecting said main processing unit and said I/O processing unit, and
      a second dual-port RAM, having a plurality of memory areas therein, interconnecting said main processing unit and said servo control unit,
      said I/O processing unit, said servo control unit, and said main processing unit each include respective CPUs, said CPUs sending and receiving control information through said first and second dual-port RAMs.

8. A robot control system according to claim 8, said robot being a welding robot, said robot control system further comprising:
   a sequencer and a welding controller connected to said I/O processing unit; and
   an hydraulic unit,
   said servo control unit being connected directly and through said hydraulic unit to said welding robot, said welding controller being connected to said welding robot.

9. A robot controller, for controlling operation of a robot, comprising:
   teaching means, including input means and processing means, for processing user input indicative of desired operations and a mode of operation of the robot into processed operation signals; and
   robot control means, coupled to said teaching means and the robot, for controlling the robot in response to said processed operation signals, comprising
      I/O processing means, coupled to and receiving said processed operation signals,
      a first dual-port RAM, coupled to said I/O processing means, for receiving and storing said processed operation signals in memory locations, main processing means, coupled to said first dual-port RAM, for receiving and processing said stored processed operation signals into pulse signals representative of intervals or distances which axes of the robot are to be driven, a second dual-port RAM, coupled to said main processing means, for receiving and storing said pulse signals in memory locations, and servo control means, coupled to said second dual-port RAM, for receiving and processing said stored pulse signals into robot drive signals for controlling the robot and for reading positions of said axes of the robot and outputting processed positional signals indicative thereof to said second dual-port RAM for storage, said main processing means operative to receive said stored processed positional signals from said second dual-port RAM for processing said pulse signals.

10. The robot controller fo claim 11, said main processing means receiving said stored processed positional signals from said second dual-port RAM substantially simultaneously with reception of said stored processed operation signals from said first dual-port RAM.

11. The robot controller of claim 11, modes of operation of the robot comprising a teaching mode, playback mode, automatic mode, editing mode, a parameter setting mode.

12. The robot controller of claim 11, said robot being a robot welder, said robot controller further comprisign sequencing means and welding control means, coupled to said I/O processing unit, for controlling welding performed by said robot welder.

13. The robot controller of claim 11, said teaching means comprising a joystick with a push-button switch mounted on a distal end thereof operable for starting operation of the robot.

14. The robot controller of claim 15, said teaching means further comprising a ten-key pad.

15. The robot controller of claim 16, said teaching means further comprising an LCD display means.

* * * * *